United States Patent
Maurer et al.

(10) Patent No.: US 10,060,352 B2
(45) Date of Patent: Aug. 28, 2018

(54) IMPINGEMENT COOLED WALL ARRANGEMENT

(71) Applicant: Ansaldo Energia Switzerland AG, Baden (CH)

(72) Inventors: Michael Thomas Maurer, Bad Saeckingen (DE); Urs Benz, Gipf-Oberfrick (CH); Felix Baumgartner, Waldshut-Tiengen (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 181 days.

(21) Appl. No.: 14/732,070

(22) Filed: Jun. 5, 2015

(65) Prior Publication Data

US 2015/0361889 A1    Dec. 17, 2015

(30) Foreign Application Priority Data

Jun. 11, 2014 (EP) ..................................... 14171995

(51) Int. Cl.
    *F02C 1/00*    (2006.01)
    *F02C 7/18*    (2006.01)
    (Continued)

(52) U.S. Cl.
    CPC ............... *F02C 7/18* (2013.01); *F02C 3/04* (2013.01); *F23R 3/002* (2013.01);
    (Continued)

(58) Field of Classification Search
    CPC .............. F23R 2900/03044; F23R 3/06; F05B 2260/201; F05D 2260/201
    See application file for complete search history.

(56) References Cited

U.S. PATENT DOCUMENTS

| 4,719,748 A | 1/1988 | Davis, Jr. et al. |
| 4,887,425 A | 12/1989 | Vdoviak |
| (Continued) | | |

FOREIGN PATENT DOCUMENTS

| CA | 2 859 154 A1 | 6/2013 |
| EP | 1 188 902 A1 | 3/2002 |
| (Continued) | | |

OTHER PUBLICATIONS

Office Action (First) dated Dec. 25, 2015, by the State Intellectual Property Office of the People's Republic of Chine in corresponding Chinese Patent Application No. 201410401041.1, and an English translation of the Office Action. (24 pgs).

(Continued)

*Primary Examiner* — Gerald L Sung

(74) *Attorney, Agent, or Firm* — Buchanan Ingersoll & Rooney PC

(57) ABSTRACT

An impingement cooled wall arrangement includes a flow diverter arranged in the cooling flow path between the cooled wall and a sleeve to divert a cross flow away from a second aperture. The flow diverter extends in downstream direction of the cross flow beyond the second aperture with a first leg extending along one side of the second aperture in downstream direction of the cross flow and a second leg extending along the other side of the second aperture. No impingement cooling aperture is arranged in a first convective cooling section of the wall between the upstream end and downstream end of the flow diverter outside the section shielded by the diverter.

17 Claims, 3 Drawing Sheets

(51) Int. Cl.
*F23R 3/00* (2006.01)
*F02C 3/04* (2006.01)

(52) U.S. Cl.
CPC .... *F05D 2220/32* (2013.01); *F05D 2260/201* (2013.01); *F05D 2260/2212* (2013.01); *F23R 2900/03044* (2013.01)

(56) References Cited

U.S. PATENT DOCUMENTS

| | | | |
|---|---|---|---|
| 5,297,391 A | 3/1994 | Roche | |
| 5,533,864 A * | 7/1996 | Nomoto | F01D 5/186 415/115 |
| 5,605,046 A | 2/1997 | Liang | |
| 7,600,383 B2 | 10/2009 | Bunel et al. | |
| 8,387,396 B2 * | 3/2013 | Chen | F01D 9/023 60/752 |
| 2006/0016192 A1 | 1/2006 | Bunel et al. | |
| 2006/0042255 A1 * | 3/2006 | Bunker | F01D 25/12 60/752 |
| 2008/0166220 A1 | 7/2008 | Chen et al. | |
| 2008/0271458 A1 * | 11/2008 | Ekkad | F23R 3/06 60/755 |
| 2010/0031665 A1 * | 2/2010 | Chokshi | F01D 5/186 60/760 |
| 2010/0251723 A1 * | 10/2010 | Chen | F02C 7/18 60/760 |
| 2013/0081401 A1 * | 4/2013 | Kim | F23R 3/06 60/772 |
| 2013/0327057 A1 * | 12/2013 | Cunha | F23R 3/002 60/782 |
| 2013/0333388 A1 * | 12/2013 | Polisetty | F23R 3/002 60/752 |
| 2014/0290256 A1 | 10/2014 | Fujimoto et al. | |
| 2015/0198335 A1 * | 7/2015 | Kim | F23R 3/54 60/760 |
| 2016/0281987 A1 * | 9/2016 | Torkaman | F23R 3/002 |

FOREIGN PATENT DOCUMENTS

| | | |
|---|---|---|
| FR | 2 689 567 A1 | 10/1993 |
| IT | 1228662 B | 7/1991 |
| WO | WO 2011/020485 A1 | 2/2011 |
| WO | 2011054760 A1 | 5/2011 |

OTHER PUBLICATIONS

European Search Report dated Nov. 17, 2014 for Application No. 14171995.5.

First Office Action dated Sep. 22, 2017 in corresponding Chinese Patent Appiication No. 201510318236.4, and Engiish translation thereof.

* cited by examiner

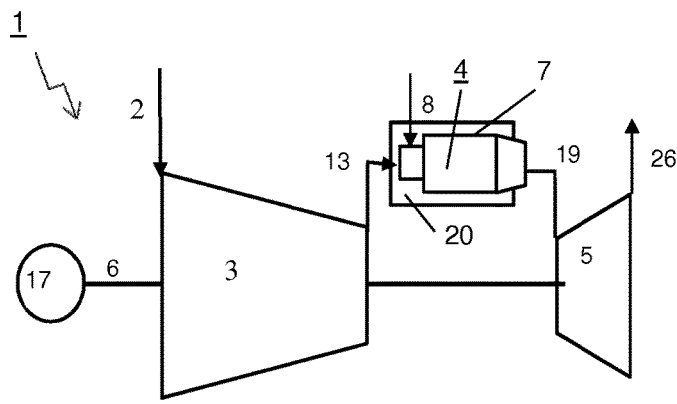
Fig. 1
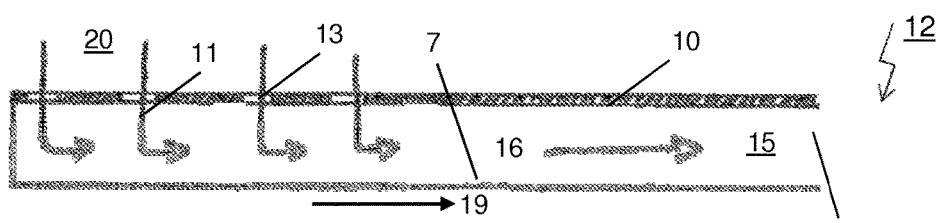
Fig. 2a
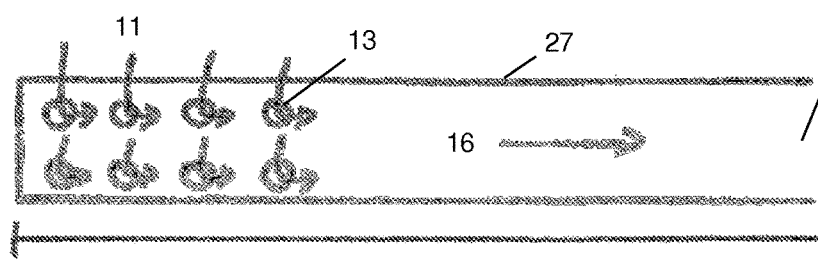
Fig. 2b
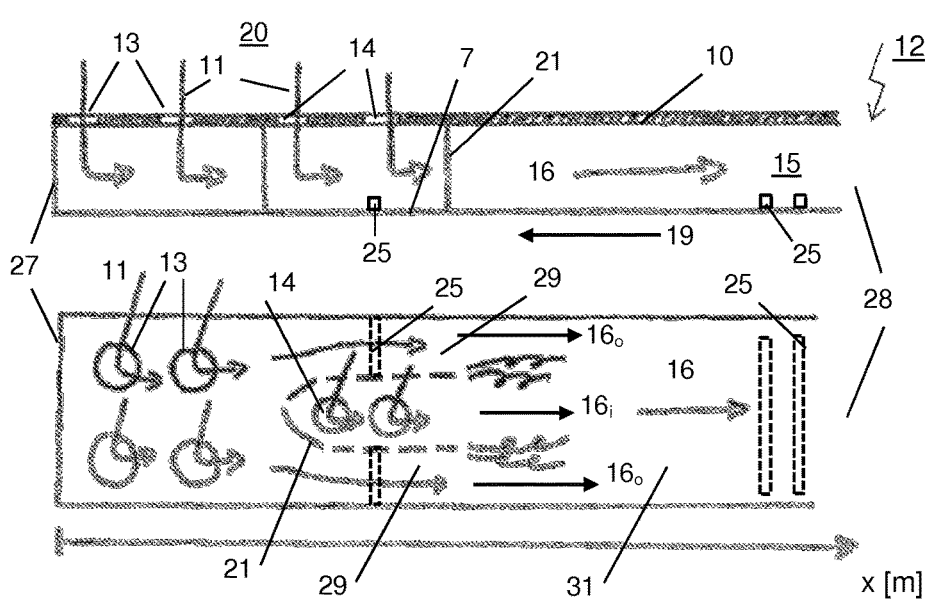
Fig. 3a
Fig. 3b

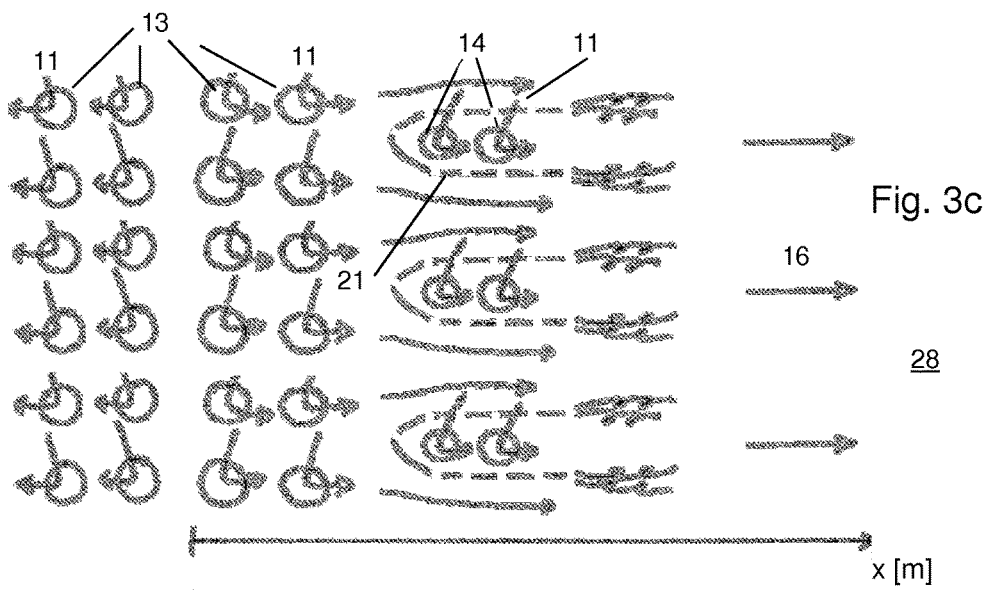
Fig. 3c
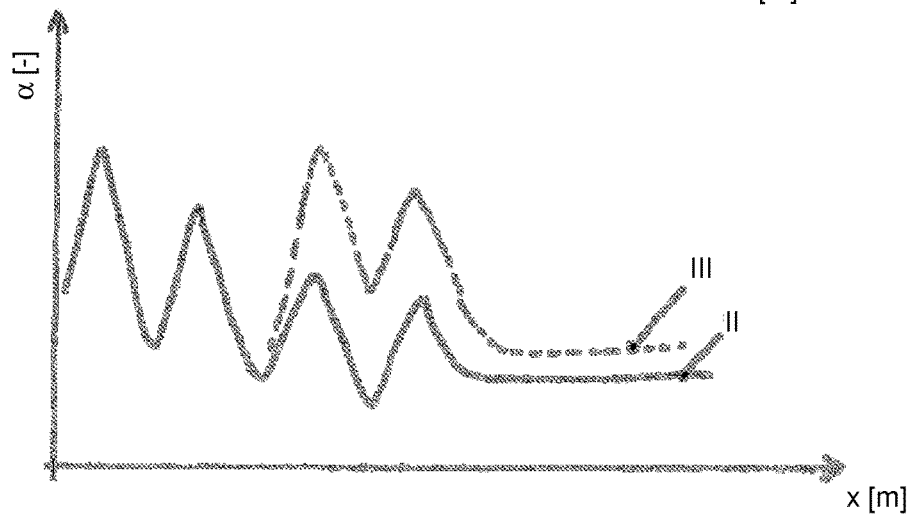
Fig. 4
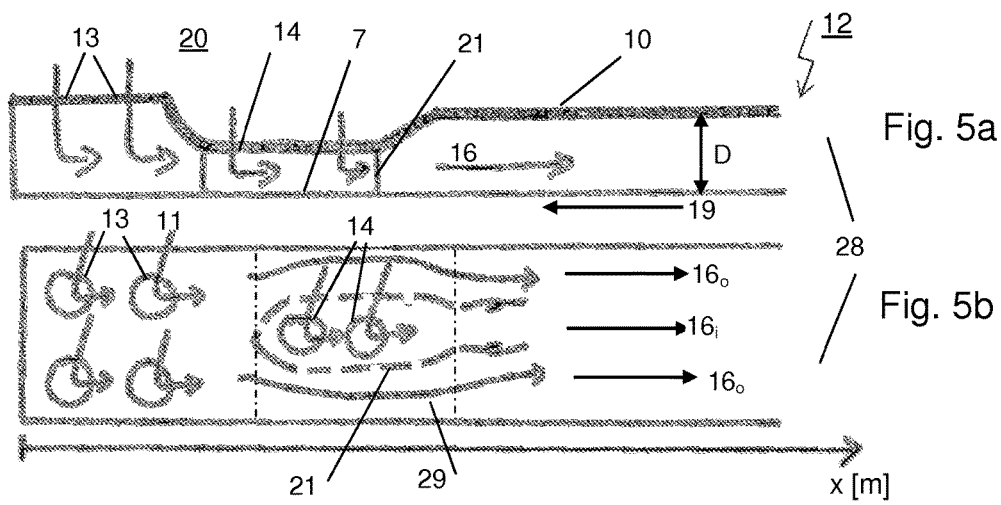
Fig. 5a
Fig. 5b

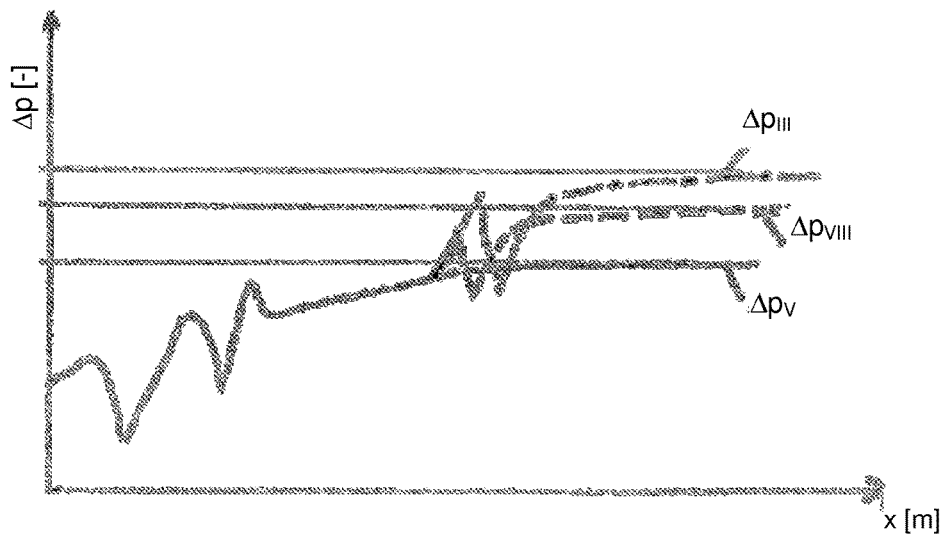
Fig. 6
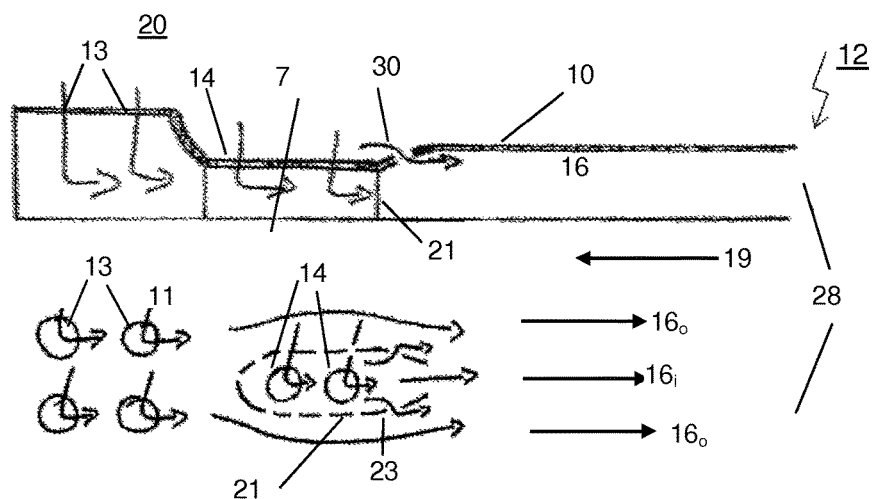
Fig. 7a
Fig. 7b
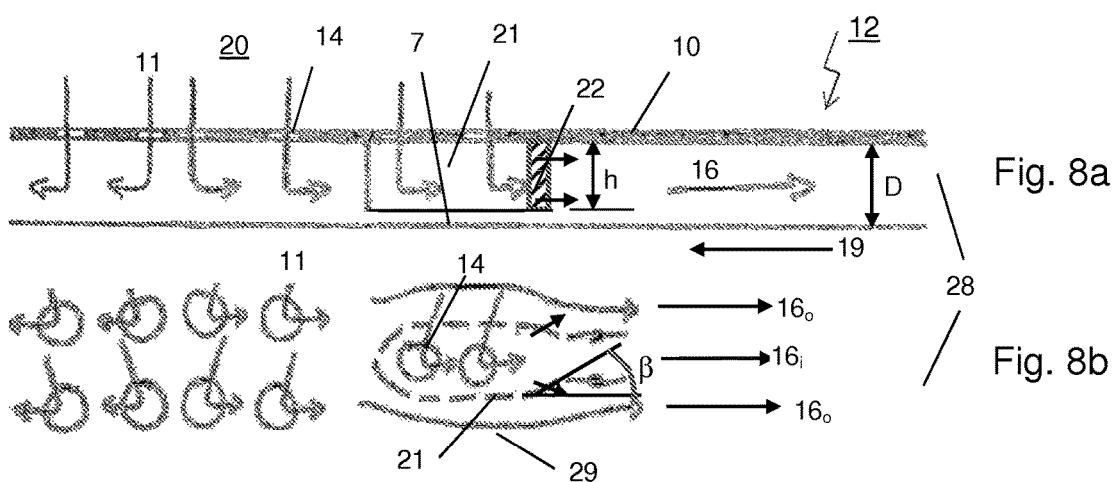
Fig. 8a
Fig. 8b

IMPINGEMENT COOLED WALL ARRANGEMENT

TECHNICAL FIELD

The disclosure refers to an Impingement cooling arrangement, more particularly, to an Impingement cooled wall arrangement for cooling a wall exposed to hot gases.

BACKGROUND OF THE DISCLOSURE

The thermodynamic efficiency of power generating cycles depends on the maximum temperature of its working fluid which, in the case for example of a gas turbine, is the hot gas exiting the combustor. The maximum feasible temperature of the hot gas is limited by combustion emissions as well as by the operating temperature limit of the metal parts in contact with this hot gas, and on the ability to cool these parts below the hot gas temperature. The cooling of the hot gas duct walls forming the hot gas flow paths of advanced heavy duty gas turbines is difficult and currently known cooling methods carry high performance penalties, i.e. lead to a reduction in power and efficiency.

Impingement cooling is one of the most effective cooling techniques for components which are exposed to gases with high hot gas temperatures. For impingement cooling of a wall a sleeve is disposed a short distance away from the wall outer surface (the surface facing away from the hot gas). The impingement sleeve contains an array of holes through which compressed gas discharges to generate an array of air jets which impinge on and cool the outer surface of the wall. After impingement the compressed gas flows as cooling gas in a cooling path delimited by the wall and the impingement sleeve towards an end of cooling flow path. This flow leads to a so called cross flow. Usually the first impingement rows allow impingement on the wall without any cross-flow in the cooling channel. As the number of subsequent impingement rows is increasing towards the end of the cooling flow path, the cross flow in the cooling channel builds up. As a disadvantage, the increasing cross flow in the cooling channel hinders and lowers the possible heat transfer coefficients of the impingement cooling as the impingement jets are diverted and bent away from the wall (see FIG. 2a) before they impinge on it.

To limit the cross flow velocity it has been suggested in the U.S. Pat. No. 4,719,748 A to increase the height of the cooling channel over the length of the cooling channel. However, an increase of the height of the cooling channel reduces the impingement effect of the jet reaching the duct wall.

In addition to the therefore decreasing efficiency of impingement cooling over the length of a wall cooled with impingement cooling the typical heat load of a duct wall is not homogeneous. For example most combustion chambers of gas turbines show an inclination with respect to the engine axis, which leads to a change in the hot gas flow direction. The hot gas flow in the combustion chamber has to adapt to this change in main flow direction leading to areas with higher heat load, so-called hot spots, on typical locations off the combustion chamber walls. To ensure the life time of the areas of the wall which are exposed to increased heat load as increased cooling is required at these locations.

SUMMARY OF THE DISCLOSURE

The object of the present disclosure is to propose an impingement cooled wall arrangement which allows efficient impingement cooling of a wall independent of the position on the wall guiding a hot gas flow and to maintain a high cooling efficiency along the extension of a wall.

The disclosed impingement cooled wall arrangement comprises an impingement sleeve and a wall exposed to a hot gas during operation. The impingement sleeve is at least partly disposed in a plenum and spaced at a distance from the wall to form a cooling flow path between the wall and the impingement sleeve such that during operation compressed gas injected from the plenum through first apertures in the cooling sleeve impinges on the wall. After impinging on the wall the compressed gas flows as a cross flow towards an exit at a downstream end of the cooling flow path thereby further cooling the wall.

Downstream of the at least one first aperture a flow diverter (also simply called diverter) is arranged in the cooling flow path to divert the cross flow away from a second aperture. The flow diverter extends from a location between the first aperture and the second aperture in downstream direction of the cross flow beyond the second aperture (the first aperture can be a plurality of first aperture and the second aperture can be a plurality of apertures). The flow diverter has a first leg extending along on one side of the second aperture in downstream direction of the cross flow and a second leg extending along on the other side of the second aperture in downstream direction of the cross flow. In the cooling wall arrangement no impingement cooling aperture is arranged in a first convective cooling section of the wall, which is the wall section between the upstream end and downstream end of flow diverter outside the section shielded by the diverter. The shielded section is the section between the legs of the flow diverter. The outside section can for example extend from one diverter to a neighbouring diverter in an arrangement with a plurality of diverters arranged in the cooling flow path or from one diverter to a side wall delimiting the cooling flow path.

In contrast to the convectively cooled outside section an inside section of the flow diverter, i.e. the section extending from an upstream end of the flow diverter between the legs of the flow diverter to the downstream end of the legs is impingement cooled. The inside section can be at least partly shielded from the cross flow of the first aperture.

Compressed gas injected from the second apertures into the section between the two legs of the diverter impinges on the wall for effective impingement cooling of this wall section. After impingement the compressed gas flows towards the downstream end of the diverter forming a new cross flow. The cross flow formed inside the diverter flows out into the downstream direction through an opening between the downstream ends of the legs of the diverter and joins the cross flow of the first apertures which is guided around the diverter through the first convective cooling section. The cross flow which is guided around the diverter can have an increased flow velocity leading to effective convective cooling in the first convective cooling section.

Such an arrangement can for example be used for cooling a duct wall of a gas turbine, more specifically for cooling a wall of a combustor or combustion chamber.

The cooling flow and the hot gas flow typically flow in counter flow, i.e. the cooling flow flows towards the downstream end of the cooling flow path and the hot gas in opposite direction. However, arrangements with parallel cooling air flow and hot gas flow are conceivable. Such a parallel flow arrangement can be advantageous for combustion chambers and combustor arrangements with staged or sequential combustion where additional air is injected in the second combustion stage. The cooling air can for example also be air for a so called late lean combustion. Further, the cooling air can be used as dilution air for a second combustion stage to cool the hot gases by admixing the cooling air to the hot gas downstream of a first flame.

A flow diverter can be a rib or a wall extending into the cooling channel from the sleeve or the duct wall or can be connecting the sleeve with the duct wall.

Typically the flow diverter is connected to the sleeve or forms an integral part of the sleeve as the thermal load of the sleeve is lower, since it is not exposed to the hot gas, and cheaper materials can therefore be used. Alternatively, the flow diverter can be connected to the duct wall or form an integral part of the duct wall. In this case they can act as cooling ribs to better cool the duct wall.

According to another embodiment of the impingement cooled wall arrangement the cross section for the cross flow is reduced at a position in flow direction of the second aperture relative to the cross section of the cooling flow path upstream of the flow diverter. The cross section for the cross flow is the unobstructed cross section of the cooling flow path normal to a main flow direction of the cross flow. The reduction in cross section facilitates the acceleration of the cross flow around the diverter for better convective heat transfer in the outside section.

According to a further embodiment the cross section for the cross flow around the diverter increases towards a downstream end of the flow diverter relative to the cross section for the cross flow at the position in flow direction of the second aperture.

By increasing the cross section the cross flow around the diverter can be decelerated. By deceleration dynamic pressure can be recovered to minimize pressure losses of the impingement cooled wall arrangement. It can for example be decelerated to a flow velocity substantially equal to the flow velocity of the cross flow leaving the diverter to minimize mixing losses of the cross flows.

Substantially equal flow velocities can mean that the difference between flow velocity in the area downstream of the diverter and the flow velocity in the areas at the sides of the diverters is less than 30% of the overall flow velocity. Preferably the difference is less than 10%.

In one embodiment of the impingement cooled wall arrangement the legs of the flow diverter turn towards each other at the downstream end of the flow diverter thereby increasing the cross section for the cross flow outside the flow diverter. In a central region of the flow diverter the legs can for example extend parallel to each other and parallel to cross flow direction. The legs can be parallel for 50% or more of the extension of the flow diverter in flow direction.

Such an arrangement can work as a diffusor for the cross flow around the diverter and as a nozzle for the cross flow leaving the diverter. The cross flow leaving the diverter can be accelerated due to the reduction in cross section between the downstream ends of the diverter legs.

In an impingement cooled wall arrangement the flow diverter can extend from the duct wall all the way to the impingement sleeve.

In another embodiment of an impingement cooled wall arrangement the flow diverter can extend from the duct wall or from the impingement sleeve into the cooling flow path with a height which is smaller than the height of the cooling flow path.

In a further embodiment of the impingement cooled wall arrangement the height of the cooling flow path is reduced in the region of the flow diverter relative to the height of the cooing flow path upstream of the flow diverter. By reducing the flow path height the cross section available for the cross flow is reduced to accelerate the flow velocity of the cross flow. The region of the flow diverter is the section of the wall arrangement extending from the upstream end of the flow diverter in flow direction of the cross flow to the downstream end of the flow diverter.

According to yet another embodiment the height of the cooling flow path is increased downstream of the flow diverter relative to the height of the cooing flow path in the region of the flow diverter. By increasing the height the cross section available for the cross flow is increased to decelerate the flow velocity of the cross flow.

In yet another embodiment of the impingement cooled wall arrangement an additional compressed gas injection hole for injecting compressed gas into the cross flow is arranged in the sleeve in a downstream region of the flow diverter. The additional compressed gas can help to equalize the flow velocity of the cross flow downstream of the diverter thus avoiding unnecessary pressure drops due to mixing losses. The downstream region of the diverter can for example be defined as the region extending in flow direction of the cross flow from the position of the last second impingement hole to a position two times the cooling flow path height downstream of the flow diverter.

To improve convective heat transfer a turbulator can be arranged on the duct wall section of the cross flow between the upstream end and downstream end of flow diverter outside the section shielded by the diverter, i.e. in the region between legs of neighbouring flow diverters, respectively between the leg of a flow diverter and a cooling field wall delimiting the impingement cooled wall arrangement. In addition or alternatively a turbulator can be arranged on the duct wall section downstream of a flow diverter for heat transfer enhancement. A turbulator can for example be a rib or pin arranged on or extending from the wall.

In yet another embodiment the impingement cooled wall arrangement the downstream end of a leg of the flow diverter has a porous section. Alternatively or in combination balancing hole to allow a gas flow through the downstream end of the leg can be arranged in the downstream end of a leg of the diverter. Such a porous section or balancing hole allows the flow of compressed gas through the downstream end of the leg in the direction of a difference in the static pressure on both sides of the wall. This can reduce the pressure difference before the flows join at the downstream end. In addition, for converging legs, i.e. for legs of one diverter turn towards each other at the downstream end the flow separation of the cross flow on the outside of the leg can be avoided, respectively the turning angle or converging angle of the downstream end of the leg relative to the direction of the cross flow can be increased allowing a fast change in the cross section thus reducing the extension of the diverter legs in flow direction before the cross flow originating inside the diverter can be mixed with the cross flow guided around the diverter.

Besides the impingement cooled wall arrangement a combustor such an impingement cooled wall arrangement is an object of the disclosure. In addition a gas turbine comprising such an impingement cooled wall arrangement is an object of the disclosure.

Further, a method for impingement cooling a wall exposed to a hot gas during operation is an object of the disclosure. The method comprises providing impingement sleeve which is at least partly disposed in a compressed gas plenum, and spaced at a distance from the wall to form a cooling flow path between the wall and the impingement sleeve. The method further comprises the steps of injecting compressed gas from the plenum through a first aperture into the cooling flow path, impinging the compressed gas on the wall, and directing compressed gas as a cross flow towards an exit at a downstream end of the cooling flow path. To improve the cooling efficiency of a subsequent second impingement the cross flow is diverted by a flow diverter, which is arranged in the cooling flow path downstream of a first aperture away from at least one second aperture. The flow diverter extends from a location between the first aperture and the second aperture in downstream direction of the cross flow beyond the second aperture with a first leg extending along on one side of the second aperture in downstream direction of the cross flow and a second leg extending along on the other side of the second aperture in downstream direction of the cross flow. According to the method no impingement compressed gas is injected in is arranged a first convective cooling section of the wall. The first convective cooling section of the wall is the wall section between the upstream end and downstream end of flow diverter outside the section shielded by the diverter. The wall is convectively cooled in this section by the cross flow.

According to a further embodiment of the method the cross flow is accelerated when it enters the first convective cooling section of the cooling flow path.

In yet another embodiment of the method for impingement cooling the wall the cross flow which is flowing through first convective cooling section is decelerated when it enters the section of the cooling flow path which is extending in downstream direction from the downstream end of the flow diverter. By decelerating dynamic pressure can be recovered and the flow velocity can be adjusted to substantially the flow velocity to the flow leaving the diverter, thereby reducing mixing losses.

BRIEF DESCRIPTION OF THE DRAWINGS

The disclosure, its nature as well as its advantages, shall be described in more detail below with the aid of the accompanying schematic drawings of preferred but non-exclusive embodiments.

Referring to the drawings:

FIG. 1 shows a gas turbine with a compressor, a combustion arrangement, and a turbine;

FIG. 2a, 2b shows an impingement cooled wall arrangement;

FIG. 3a, 3b shows an impingement cooled wall arrangement with a diverter to shield a second aperture for impingement cooling;

FIG. 3c shows an impingement cooled wall arrangement with a diverter to shield a second aperture for impingement cooling;

FIG. 4 shows the development the resulting heat transfer coefficient over the length of a conventional impingement cooled wall and an impingement cooled wall with diverters;

FIG. 5a, 5b shows an impingement cooled wall arrangement with a diverter to shield a second aperture for impingement cooling and adapted cooling flow path height;

FIG. 6 shows the development the pressure drop over the length of a an impingement cooled wall with diverters with and without dynamic pressure recovery;

FIG. 7a, b shows an impingement cooled wall arrangement with a diverter to shield a second aperture for impingement cooling and additional cooling air injection hole;

FIG. 8a, b shows an impingement cooled wall arrangement with a diverter to shield a second aperture for impingement cooling porous downstream ends of the diverter legs.

EMBODIMENTS OF THE DISCLOSURE

FIG. 1 shows a gas turbine 1 with an impingement cooled combustor 4. It comprises a compressor 3, a combustor 4, and a turbine 5.

Intake air 2 is compressed to compressed gas 11 by the compressor 3 and feed to the combustor via a plenum 20 to a combustor. Fuel 8 is burned with the compressed gas in the combustor 4 to generate a hot gas flow 19. The hot gas is expended in the turbine 5 generating mechanical work.

Typically, the gas turbine system includes a generator 17 which is coupled to a shaft 6 of the gas turbine 1. The gas turbine 1 further comprises a cooling system for the turbine 5 and the combustor 4, which is not shown, as it is not the subject of this disclosure.

Exhaust gases 26 leave the turbine 5. The remaining heat is typically used in a subsequent water steam cycle, which is also not shown here.

FIG. 2a shows a cut through an impingement cooled wall arrangement 12 and FIG. 2b shows a top view of the impingement cooled wall arrangement 12 of FIG. 2a. As shown the impingement cooled wall arrangement 12 comprises a wall 7 which is exposed to a hot gas flow 19 on one side. A cooling sleeve 10 comprising apertures 14 for impingement cooling of the wall 7 is arranged at a distance above the wall 7. Compressed gas 11 is feed from the plenum 20 through apertures 13 and impinges on the wall 7. After the compressed gas 11 impinges on the wall 7 it flows as a cross flow 16 in the cooling flow path 15 formed by the wall 7 and the sleeve 10 towards the downstream end 28 of the cooling flow path 15. In the example of FIG. 2a the hot gas flow 19 and cross flow 16 flow in the same direction parallel to each other towards the downstream end 28 of the cooling flow path 15.

FIG. 2b shows a top view of the arrangement of FIG. 2a. The impingement cooled wall arrangement 12 is delimited to an upstream end and to both sides by a cooling field wall 27. Two rows of apertures 13 are arranged in parallel. The compressed gas 11 flows through the apertures 13 to form a cross flow 16.

In the example shown in FIG. 2a, 2b apertures for compressed gas injection on the wall 7 are arranged in an upstream section of the impingement cooled wall arrangement 12. The downstream section is only cooled by the cross flow 16. The length x of the cooling flow path starting from the upstream end is indicated below the FIG. 2b.

A first example of an impingement cooled wall arrangement according to the disclosure is shown in FIG. 3a, 3b, FIG. 3a, 3b is based on FIG. 2a, 2b and same elements are numbered identically. The number of first apertures 13 arranged in the direction of the cross flow is reduced compared to the arrangement of FIG. 2a, 2b. In addition the arrangement shown in FIG. 3a, 3b has diverter 21 arranged downstream (in direction of the cross flow) of the group of first apertures 13. The flow diverter 21 shields a group of second apertures 14 from the cross flow 16 of the compressed gas introduced through the first apertures 13 and it around second apertures 14. Thus compressed gas 11 introduced through the second apertures can impinge on the wall 7 without deflection by the cross flow originating from the first apertures 13.

The deflector 21 has a U-formed shape with the two legs of the U extending in flow direction of the cross flow 16 around the second apertures 14. Due to the compressed gas 11 introduced through the second apertures 14 a cross flow or inner cross flow $16_i$ starts in the diverter 21.

In the first convective section 29, which is the region outside the diverter 21, in the region between the diverter 21, and the cooling field wall 27, or more precisely between the legs of the diverter 21 and the cooling field wall 27 in the section between the upstream and downstream end of the diverter 21, there is no impingement cooling. This section of the wall 7 is convectively cooled by the diverted cross flow.

At the downstream end of the flow diverter 21 the outer cross flow 16o and the inner cross flow 16i merge. Differences in the flow velocity of the inner cross flow 16i and outer flow velocity 16o can lead to mixing losses, i.e. pressure losses. The resulting cross flow 16 of the inner and outer cross flow 16i, 16o cool the second convective section 31 which extends from the downstream end of the diverter 21 to the downstream end 28 of the impingement cooled wall arrangement 12.

To further enhance heat transfer in the first and second convective section 29, 31 ribs 25 are arranged on the wall 7.

In this example the hot gas flow 19 is indicated as counter flow to the direction of the cross flow 16.

FIG. 3c shows modification based on the example shown in FIG. 3b. In the example of FIG. 3c the cooling arrangement has a plurality of diverters 21 without a separation of a cooling field wall. Also there is no cooling field wall defining an upstream end of the impingement cooled wall. At the upstream end further first apertures 13 are arranged. However, the compressed gas 11 introduced through the first two rows of first apertures 13 flows in the opposite direction of the cross flow 16 away from the diverter 21. The length x of the cooling flow path starting from the upstream end is indicated below the FIG. 3c. Here the starting point is the location where upstream of the first apertures 13 from which cross flow 16 flows towards the diverter 21.

No ribs to enhance convective cooling are shown here but ribs or other turbulators can be added as needed.

FIG. 4 shows the development the resulting heat transfer coefficient II over the length of the impingement cooled wall of FIG. 2a/2b and the heat transfer coefficient III of the impingement cooled wall with diverters of FIG. 3a/3b/3c. The local peaks in cooling due to impingement of the compressed gas introduced through the apertures 13, 14 on the wall 7 are clearly indicated. For the arrangement of FIG. 2a/2b without flow diverter the peaks and overall heat transfer coefficient is reduced along the length x of the cooling flow path 15. The resulting heat transfer coefficient over the length of the impingement cooled wall is an average heat transfer coefficient over the width of the cooled wall section. The peaks are reduced due to the cross flow 16 over the length x. For the arrangement with a diverter 21 the heat transfer coefficient III at the first shielded aperture 14 as indicated by the dotted line is as high as for the very first aperture 13.

FIG. 5a, 5b is based on FIG. 2a, 2b. It shows an impingement cooled wall arrangement with a diverter to shield a second aperture for impingement cooling and adapted cooling flow path height H. The cooling flow path height H is adapted to the local requirements for optimized cooling. In an upstream region upstream of the flow diverter 21 the flow path height H is biggest to keep the flow velocity of the cross flow low. In the region of the diverter 21 the flow path height is reduced to accelerate the cross flow guided around the flow diverter 21 through the first convective cooling section 29 (upstream and downstream end of this section is indicated by a chain-dotted line in FIG. 5b).

Part of the dynamic pressure is recovered at the downstream end of flow diverter 21 to increase the static pressure. To recover the dynamic pressure the channel height H is increased in the downstream section of the diverter 21, For further pressure recovery and to homogenize the flow velocity of the inner cross flow 16i leaving the diverter 21 and the outer cross flow 16o at the downstream end of the first convective cooling section 29 the legs of the diverter 21 are inclined towards each other at the downstream end.

This inclination or convergence leads to a nozzle like geometry with reduction of the cross section at the outlet of the diverter 21, thus accelerating the inner cross flow 16i. At the same time the inclination leads to a diffusor like geometry of the downstream end of the first convective cooling section 29, thus decelerating the outer cross flow 16o. The inclination of the legs' downstream ends can be chosen to minimize the differences between the inner and outer cross flow 16i, 16o velocities at the downstream end of the diverter 21 thereby mitigating mixing losses.

FIG. 6 shows the development the total pressure drop $\Delta p$ over the length x of an impingement cooled wall 7. The chain-dotted line III indicates the pressure loss for an embodiment like the one shown in FIG. 3 with a diverter 21 having straight legs and a constant channel height H. The dotted line VIII indicates the pressure loss for an embodiment with some pressure recovery like the one shown in FIG. 8, e.g. with a diverter 21 having a constant channel height H and diverter legs which converge towards the downstream end of the diverter 21. The solid line V indicates the pressure loss for an embodiment with optimized pressure recovery and minimized mixing losses like the one shown in FIG. 5. For the optimized pressure recovery the channel height H is reduced around the diverter and increase again downstream of the diverter. In addition the diverter legs converge towards the downstream end of the diverter 21.

The example of FIG. 7a, b is based on the example shown in FIG. 5a, b. To further minimize mixing losses additional cooling gas is introduced through injection holes 30 in the sleeve 10 at the downstream end of the diverter 21 in the region where the channel height H is increasing. In addition balancing holes 23 are provided in the converging sections of the legs at the downstream end of the diverter 21. Depending on the static pressure distribution along the legs inside of the diverter relative to outside the diverter these balancing holes 23 allow injection of cooling gas from the inside of the diverter 21 into the boundary layer of the flow around the diverter 21, respectively allow boundary layer suction. Both measures can avoid flow separation at the downstream end of the diverter and can therefore reduce the pressure loss.

The example of FIG. 8a, b is based on the example shown in FIG. 3a, b. FIG. 8a, b shows an impingement cooled wall arrangement with legs converging at the downstream end of the diverter 21. To allow converging with a large converging angle β the converging end sections of the legs are made out of a porous material to allow for boundary layer suction of addition of cooling gas into the boundary layer on the downstream ends of the diverter legs.

The impingement cooled wall arrangement shown in embodiments can be used for example in a gas turbine with can combustors. The can combustors are typically circumferentially distributed around the shaft 6 of the gas turbine and have a transition piece or transition section for the transition from a circular cross section of the combustion chamber to a cross section with a shape of a section of an annulus or practically rectangular flow cross section at the outlet, i.e. at the turbine inlet. The transition piece can be integrated into the duct or be a separate duct and the disclosed impingement cooled wall arrangement can equally be used for the duct guiding the hot gases in the transition piece.

The impingement cooled wall arrangement can also be used for cooling of any other component like for example blade cooling.

All the explained advantages are not limited to the specified combinations but can also be used in other combinations or alone without departing from the scope of the disclosure. Other possibilities are optionally conceivable, for example, the combination.

Further, the arrangement of the flow diverters relative to the flow direction in the flow path can be modified. The flow diverters can for example be included to direction of the cross flow upstream of the diverter to cause secondary flows for increased heat transfer. The diverter can also have a fluid dynamically optimized contour like a blade profile.

The disclosed impingement cooled wall arrangement and method for cooling can be used in gas turbines as well as in other machines or plants in which a wall is exposed to hot gas such as for example a furnace or a reactor.

LIST OF DESIGNATIONS

1 Gas Turbine
2 Intake air
3 Compressor
4 Combustor
5 Turbine
6 Shaft
7 Duct wall
8 Fuel
9 Burner
10 Sleeve
11 Compressed gas
12 Impingement cooled wall arrangement
13 First aperture
14 Second aperture
15 Cooling flow path
16, $16_i$, $16_o$ Cross flow
17 Generator
18 Axis
19 Hot gas flow
20 Compressed gas plenum
21 Flow diverter
22 Porous section
23 Balancing hole
24 Impingement flow
25 Turbulator (rib)
26 Exhaust gas
27 Cooling field wall
28 Downstream end
29 First convective section
30 Injection hole
31 Second convective section
h Flow diverter height
H Height of cooling flow path
x Length
α Heat transfer coefficient
β Converging angle
II heat transfer coefficient as function of location in the impingement cooled wall arrangement of FIG. 2
III heat transfer coefficient as function of location in the impingement cooled wall arrangement of FIG. 3
$\Delta p_{III}$ dynamic pressure loss as function of location in the impingement cooled wall arrangement of FIG. 3
$\Delta p_V$ dynamic pressure loss as function of location in the impingement cooled wall arrangement of FIG. 5
$\Delta p_{VIII}$ dynamic pressure loss as function of location in the impingement cooled wall arrangement of FIG. 8

The invention claimed is:

1. An impingement cooled wall arrangement comprising:
an impingement sleeve and a wall exposed to a hot gas during operation, wherein the impingement sleeve is at least partly disposed in a plenum, and spaced at a distance from the wall to form a cooling flow path between the wall and the impingement sleeve such that compressed gas injected from the plenum through a first aperture in the impingement sleeve during operation will impinge on the wall and flow as a cross flow towards an exit at a downstream end of the cooling flow path;
a flow diverter is arranged in the cooling flow path downstream of the first aperture to divert the cross flow away from a second aperture, wherein the flow diverter comprises a first leg extending along one side of the second aperture in a downstream direction of the cross flow and a second leg extending along another side of the second aperture in the downstream direction of the cross flow and wherein no impingement cooling aperture is arranged in a first convective cooling section of the wall which is a wall section between an upstream end and a downstream end of the flow diverter outside a section shielded by the flow diverter, wherein the second aperture is configured to inject the compressed gas into a section between the first leg and the second leg of the flow diverter, and the flow diverter extends from a location between the first aperture and the second aperture in the downstream direction of the cross flow beyond the second aperture, and a cross section for the cross flow is reduced at a location of the second aperture in the direction of the cross flow relative to the cross section of the cooling flow path upstream of the flow diverter, and wherein the flow diverter extends from the impingement sleeve and connecting to an outer surface of the wall.

2. The impingement cooled wall arrangement according to claim 1, wherein the cross section for the cross flow around the diverter increases towards the downstream end of the flow diverter relative to the flow cross section for the cross flow at the location of the second aperture relative to the cross section of the cooling flow path upstream of the flow diverter.

3. The impingement cooled wall arrangement according to claim 1, wherein the first leg and the second leg of the flow diverter turn towards each other at the downstream end of the flow diverter thereby increasing the cross section for the cross flow outside the flow diverter.

4. The impingement cooled wall arrangement according to claim 1, wherein a height of the cooling flow path is reduced in a region of the flow diverter relative to the height of the cooing flow path upstream of the flow diverter to accelerate a flow velocity of the cross flow.

5. The impingement cooled wall arrangement according to claim 1, wherein a height of the cooling flow path is increased downstream of the flow diverter relative to a height of the cooling flow path in the region of the flow diverter to decelerate a flow velocity of the cross flow.

6. The impingement cooled wall arrangement according to claim 1, wherein an additional injection hole for injecting the compressed gas into the cross flow is arranged in the impingement sleeve in a downstream region of the flow diverter, and wherein the downstream region of the flow diverter extends in the flow direction of the cross flow from a position of the second aperture to a position two times a cooling flow path height downstream of the flow diverter.

7. The impingement cooled wall arrangement according to claim 1, wherein a turbulator is arranged on the wall in the first convective section and/or in a second convective section downstream of the flow diverter for heat transfer enhancement.

8. The impingement cooled wall arrangement according to claim 1, wherein a downstream end of the first leg and/or the second leg of the flow diverter has a porous section or has at least one balancing hole to allow a gas flow through the downstream end of the first leg and/or the second leg.

9. A combustor and/or gas turbine comprising:
an impingement cooled wall arrangement according to claim 1.

10. The impingement cooled wall arrangement according to claim 1, wherein the second aperture comprises a plurality of second apertures, wherein the flow diverter shields the plurality of second apertures.

11. The impingement cooled wall arrangement according to claim 1, wherein the flow diverter is U-shaped with the first leg and the second leg extending in the flow direction of the cross flow around the second aperture.

12. The impingement cooled wall arrangement according to claim 1, wherein the first aperture comprises at least two rows of first apertures, each of the at least two rows of first apertures comprising at least two first apertures.

13. The impingement cooled wall arrangement according to claim 12, wherein the second aperture comprises at least two second apertures.

14. The impingement cooled wall arrangement according to claim 1, wherein a downstream end of the first leg and/or the second leg of the flow diverter has at least one balancing hole to allow a gas flow through the downstream end of the first leg and/or the second leg of the flow diverter.

15. A method for impingement cooling a wall exposed to a hot gas during operation, wherein an impingement sleeve is at least partly disposed in a plenum, and spaced at a distance from the wall to form a cooling flow path between the wall and the impingement sleeve comprising: injecting compressed gas from the plenum through a first aperture in the impingement sleeve, during operation, into the cooling flow path, impinging the compressed gas on the wall, and directing the compressed gas as a cross flow towards an exit at a downstream end of the cooling flow path; and diverting the cross flow by a flow diverter arranged in the cooling flow path downstream of the first aperture away from at least one second aperture wherein the flow diverter extends from a location between the first aperture and the at least one second aperture in a downstream direction of the cross flow beyond the at least one second aperture, with a first leg extending along one side of the at least one second aperture in the downstream direction of the cross flow and a second leg extending along another side of the at least one second aperture in the downstream direction of the cross flow and wherein no compressed gas is injected for impingement in a first convective cooling section of the wall which is a wall section between an upstream end and a downstream end of the flow diverter outside a section shielded by the flow diverter, injecting the compressed gas through the at least one second aperture in a section between the first leg and the second leg of the flow diverter, wherein a cross section for the cross flow is reduced at a location of the at least one second aperture in the direction of the cross flow relative to the cross section of the cooling flow path upstream of the flow diverter, and wherein the flow diverter extends from the impingement sleeve and connecting to an outer surface of the wall.

16. A method for impingement cooling a wall according to claim 15, wherein the cross flow is accelerated when entering the first convective cooling section of the wall.

17. A method for impingement cooling a wall according to claim 15, wherein a cross flow which is flowing through the first convective cooling section flow path which extends from the upstream end of the flow diverter to the downstream end of the flow diverter is decelerated when entering a section of the cooling flow path which extends in the downstream direction from the downstream end of the flow diverter.

* * * * *